(12) United States Patent
Andersson et al.

(10) Patent No.: US 6,236,657 B1
(45) Date of Patent: May 22, 2001

(54) POINT-TO-MULTIPOINT CONNECTIONS

(75) Inventors: Staffan Andersson, Enskede; Torgny Anders Lindberg, Tullinge; Erik Lennart Bogren, Alvsjö; Lars Novak, Lund, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/936,442

(22) Filed: Sep. 24, 1997

Related U.S. Application Data

(63) Continuation of application No. PCT/SE96/00314, filed on Mar. 11, 1996.

(51) Int. Cl.$^7$ .................................................. H04L 12/28
(52) U.S. Cl. ........................................... 370/400; 370/486
(58) Field of Search .................................... 370/251, 351, 370/225, 216, 357, 397, 469, 254, 256, 400, 408, 486

(56) References Cited

U.S. PATENT DOCUMENTS

| | | | |
|---|---|---|---|
| 5,650,998 | * 7/1997 | Angenot et al. | 370/225 |
| 5,673,264 | * 9/1997 | Hamaguchi | 370/397 |
| 6,044,065 | * 3/2000 | Andersson et al. | 370/251 |

FOREIGN PATENT DOCUMENTS

| | | |
|---|---|---|
| 82/02133 | 6/1982 | (WO) . |
| 96/08931 | 3/1996 | (WO) . |

\* cited by examiner

*Primary Examiner*—Chau Nguyen
*Assistant Examiner*—Alexander Boakye
(74) *Attorney, Agent, or Firm*—Burns, Doane, Swecker & Mathis, L.L.P.

(57) ABSTRACT

For distributive services in telecommunications networks, and in particular methods for establishing point-to-multipoint connections and multipoint-to-point connections as well as methods of releasing these types of connections. Program distribution to several subscribers uses network resources in common along common call routes. A list of potential program distribution points is created and a running index is associated with each one of the distribution points. Before a connection is set up to a subscriber the list is examined and a distribution point is selected from which a point-to-point connection is set up to the subscriber. The running index is stepped up. The running index of a distribution point is stepped down during release of a connection and is examined with release of a call route section.

30 Claims, 8 Drawing Sheets

POINT-TO-MULTIPOINT CONNECTIONS

This application is a continuation of application No. PCT/SE96/00314, filed Mar. 11, 1996, which designates the United States.

TECHNICAL FIELD

This invention relates to distributive services in telecommunications networks, and in particular to methods for establishing point-to-multipoint connections and for establishing multipoint-to-point connections.

BACKGROUND OF THE INVENTION

A point-to-multipoint connection is typically used for distributing a program such as a video film or video conference, from a program source to a great number of subscribers over a telecommunication network. The act of distributing the same information to several subscribers is sometimes referred to as multicasting.

Other examples of multicasted programs are conceivable. A teacher's lesson in the form of a video lesson is one example. Another example is reading aloud from a book, such reading being transmitted, from a local library for example, over the phone or over a video network.

Depending on the geographical extent of the telecommunications network the program may be distributed nation wide, state wide or metropolitan wide.

Subscribers that want to view/listen to a multicasted program request this service by keying, at an access unit, a particular code sequence which identifies the multicast service and the particular program. Once a subscriber has done this a connection is set up between the subscriber and the program source. The program is delivered to the subscriber using this connection and the subscriber views/listens to the program at a terminal unit, such as for example a television set. When the subscriber no longer wants to view/listen to the program she/he requests the connection be released by keying in another code sequence at her/his access unit. The access unit as well as the terminal unit are located in the subscriber's home.

It is possible to simultaneously distribute, in one and the same telecommunication network, different programs from different origin points within the telecommunication network.

To-day a program is distributed from a common origin to several subscribers by setting up individual point-to-point connections to each of said subscribers. Several such point-to-point connections may have a common route along which the same program is transmitted. Along said common route the same program is transmitted in parallel using several different connections. This is a waste of resources of the telecommunication network, since every point-to-point connection requires its own resources. Said resources comprise i.a. time slots in physical lines, exchange terminals, inlet and outlet ports in exchanges. Also the capacity of exchanges which are situated along such a common route is reduced in the sense that less calls, not related to the distributed program, can be switched.

SUMMARY OF THE INVENTION

An object of the present invention is a method for establishing point-to-multipoint connections and for establishing multipoint-to-point connections avoiding the above drawback, by using, along said common route, transmission facility resources in common for several subscribers.

Another object of the invention is to provide a method for releasing a point-to-multipoint connection and for releasing a multipoint-to-point connection in such manner that a connection, along which the same information is transmitted to several subscribers simultaneously, is not released until the last of said subscribers orders disconnection of the distributed service.

BRIEF DESCRIPTION OF THE DRAWINGS

A complete understanding of the present invention may be gained by considering the following detailed description in conjunction with the accompanying drawing, in which:

FIGS. 1, 2 and 3 are arranged.

DETAILED DESCRIPTION

Figure 1:
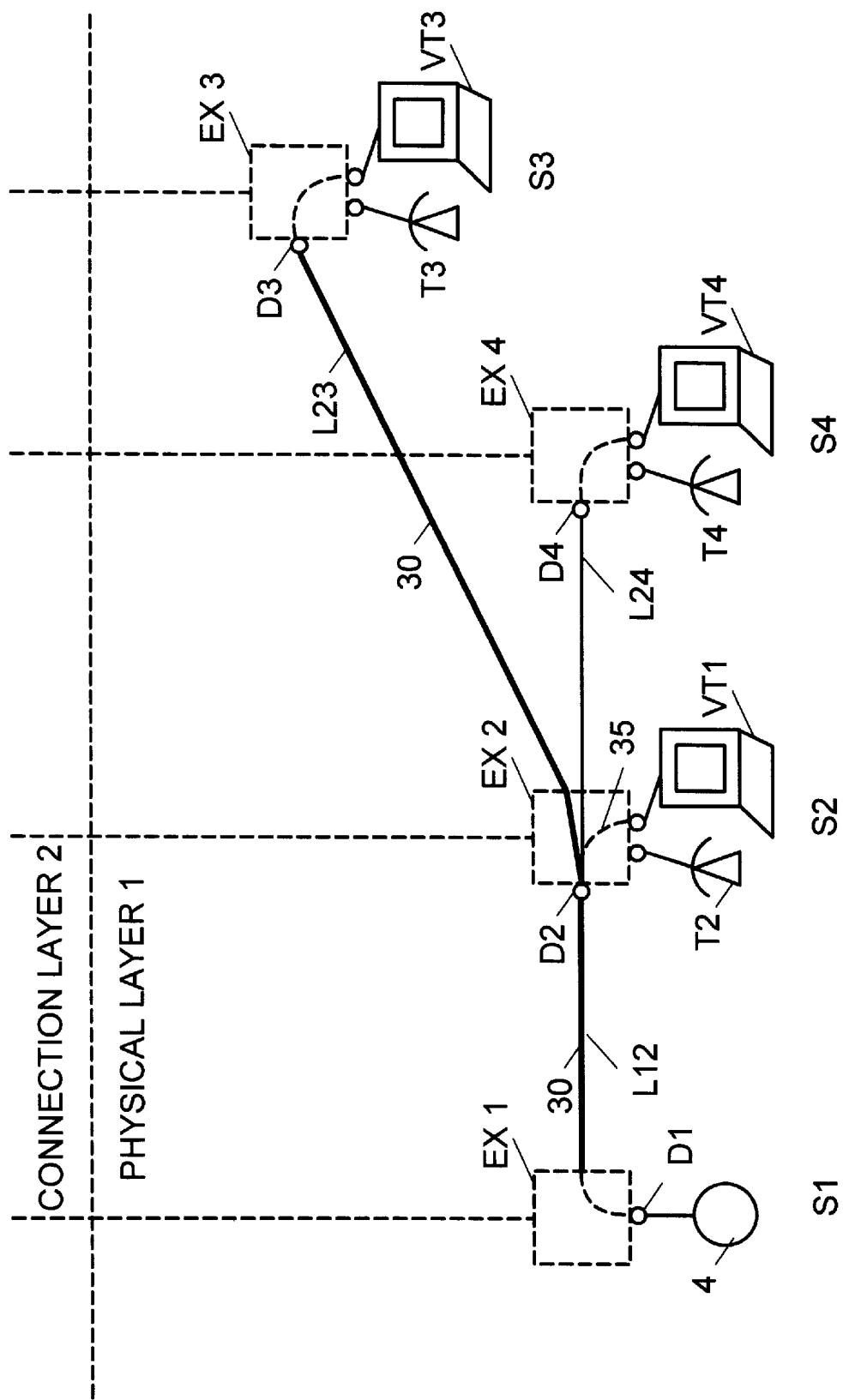
FIG. 1 is a block diagram of a part of a telecommunication network, said block diagram showing the physical layer of a call and connection separated network in which a first embodiment of the present invention is implemented.
Figure 2:
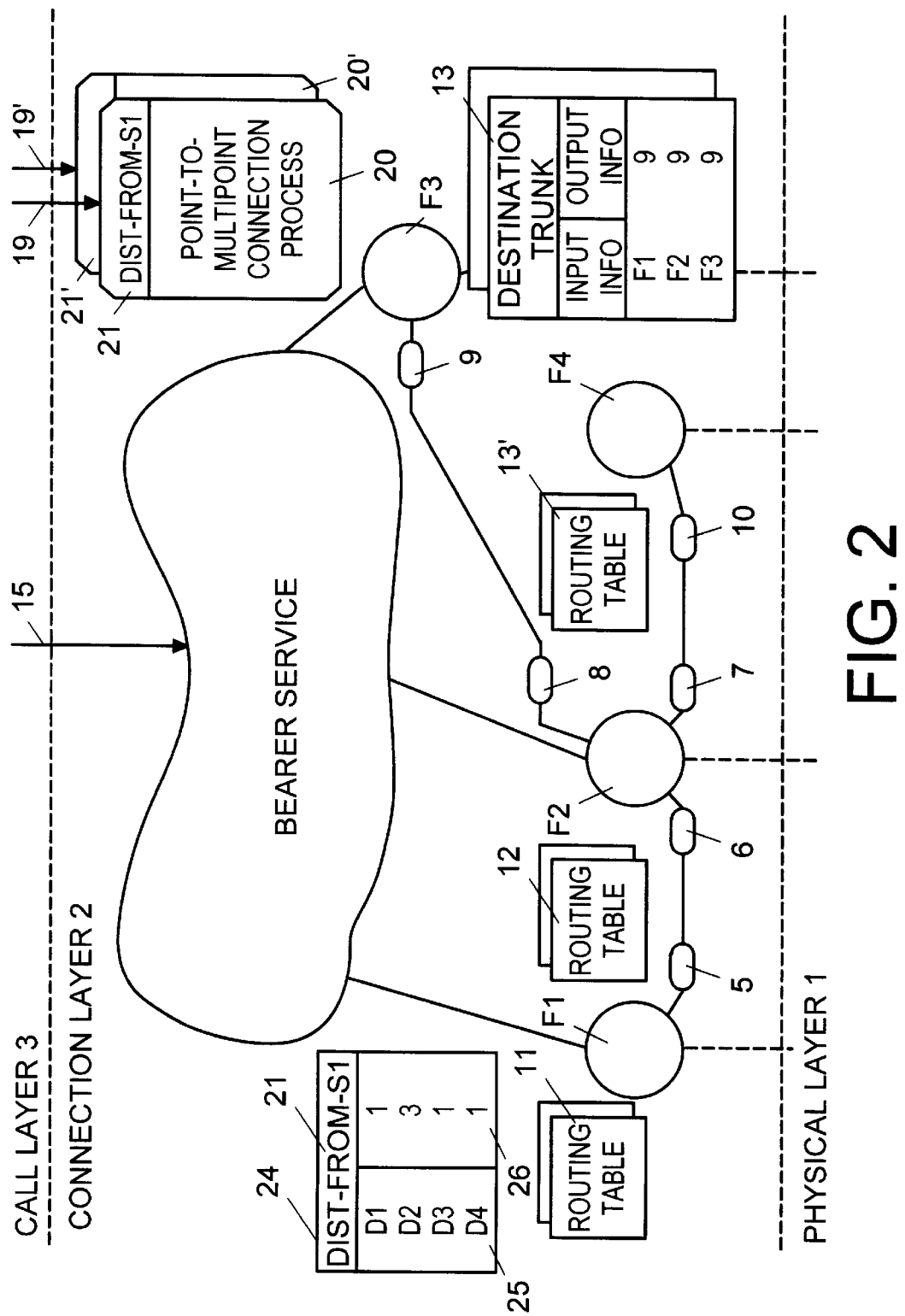
FIG. 2 is a block diagram showing an example of a logical network formed over the physical layer of FIG. 1, said logical network forming the connection layer of said call and connection separated network.
Figure 3:
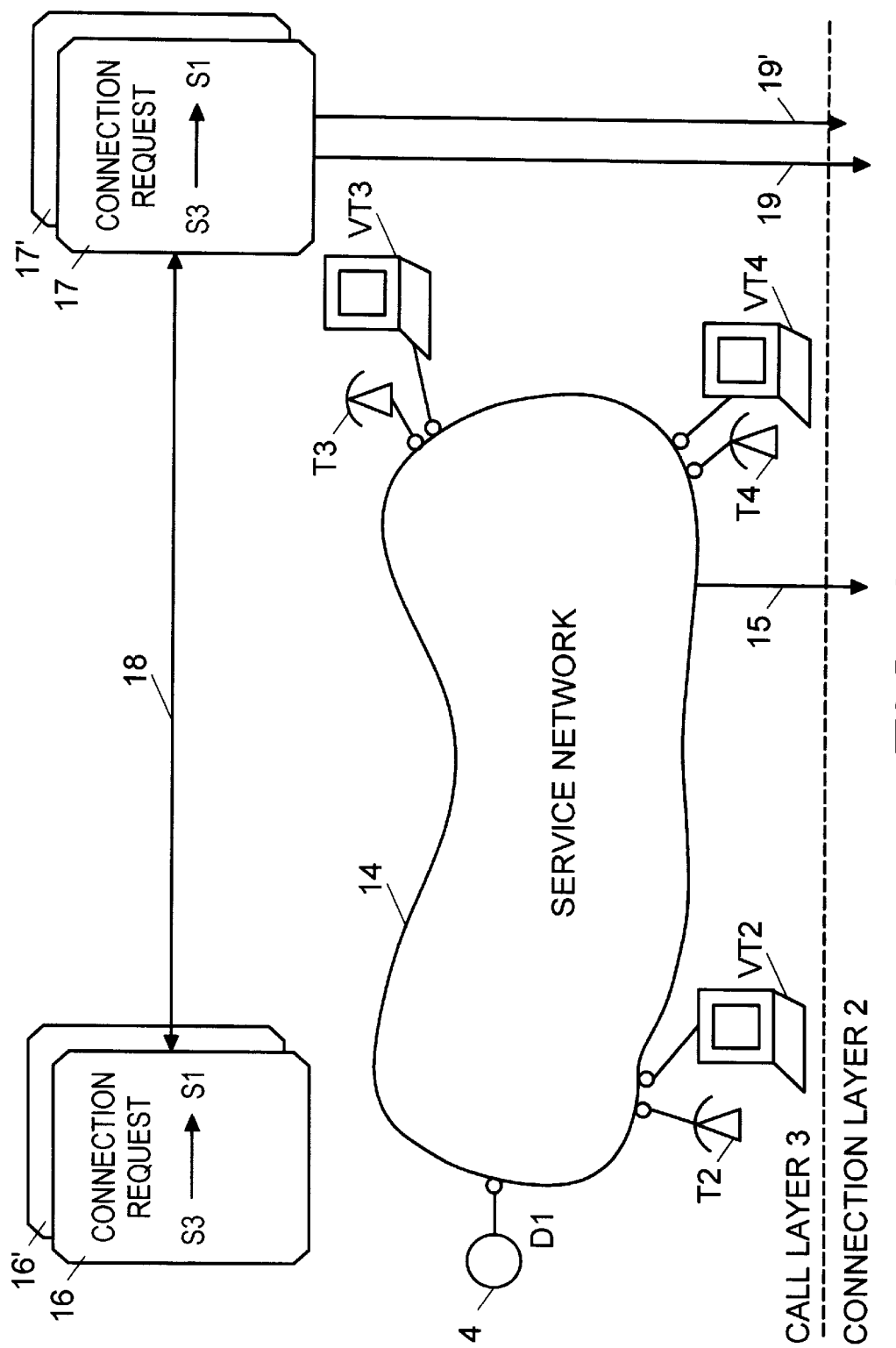
FIG. 3 is a block diagram showing the physical transmission facilities upon which the call layer of FIG. 1 and the connection layer of FIG. 2 are built.
Figures 4, 5:
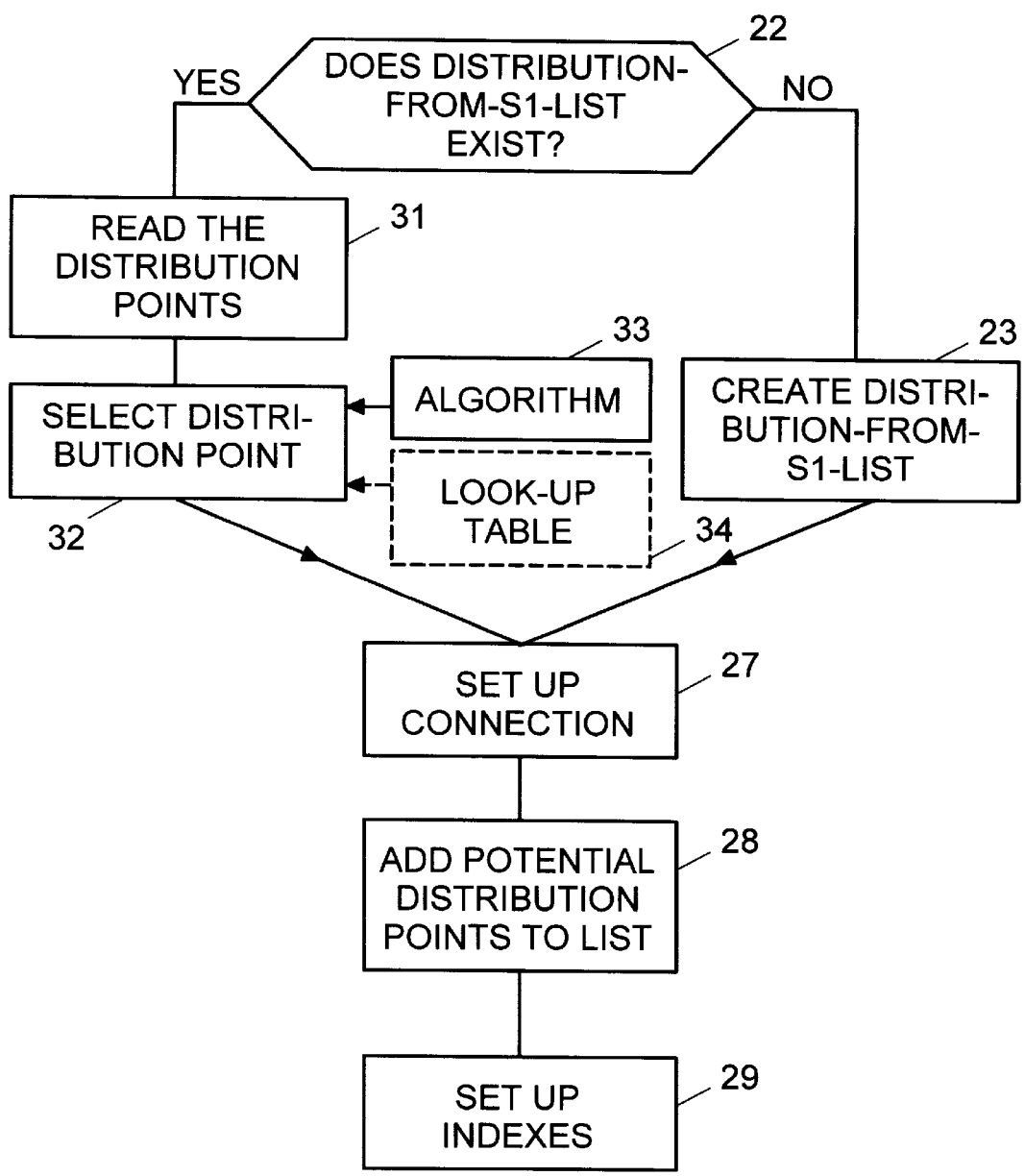
FIG. 4 is a diagram showing how
FIG. 5 is a flow diagram illustrating the method of setting up a point-to-multipoint connection in accordance with the invention.

FIGS. 1, 2 and 3, when put together in accordance with FIG. 4, illustrates a call and connection separated network built over the transmission facilities of a telecommunication network shown in FIG. 1. The call and connection separated network is divided into a physical layer 1 shown in FIG. 1, a connection layer 2 shown in FIG. 2 and a call layer 3 shown in FIG. 3.

The invention will be described in connection with a public switched broadband network, such as BISDN, although the invention is not delimited to such networks. In FIG. 1 said BISDN network is shown to comprise four exchanges EX1, EX2, EX3 and EX4 interconnected with physical lines L12, L23 and L24 in the indicated manner. Physical line L12 extends between EX1 and EX2. Physical line L23 extends between EX2 and EX3 and physical line L24 extends between EX2 and EX4. Although not shown in FIG. 1 the left end of physical line L12 is connected to EX1 with a non-shown conventional exchange terminal while its right end is connected to EX2 with another, also non-shown, conventional terminal exchange. L23 and L24 are also connected to their respective exchanges with conventional exchange terminals. None of said exchange terminals are shown in FIGS. 2 and 3. To each of the exchanges several subscriber lines are connected by way of conventional, non-shown line interface circuits. To a subscriber line a telephone set, a data terminal, and a video terminal, such as a television set and or a video tape recorder, may be connected. In order to clearly set out the method in accordance with the invention only one subscriber is shown to be connected to each of the exchanges. Each exchange has a number of input and output ports. In FIG. 1 only one input port is shown at each of the exchanges. These are labelled D1, D2, D3 and D4. An input port, i.e. a port that receives information, forms a potential distribution point from which the received information can be distributed to one, two, three or more connections as will be described in detail later on. The expression of potential reflects the fact that the received information can be copied and distributed to many connections but such copying need not take place. Such copying starts when need be, that is when there is a demand for it. This will be explained further down. A physical line or a subscriber line may be connected to a distribution point. A program source 4, transmitting a program to be distributed to several subscribers, is connected to exchange EX1 at an exchange port. This port will form a potential distribution point in exchange EX1 and is labelled D1. The program source 4 is associated with a subscriber S1.

A telephone T2 of a subscriber S2 is connected to EX2, a telephone T3 of S3 is connected to EX3 and a telephone T4 of S4 is connected to EX4. A video terminal VT2 of subscriber S2 is also connected to EX2. Subscriber S3 has also a video terminal VT3 connected to EX3. Likewise subscriber S4 has a video terminal VT4 connected to exchange EX4.

At the connection layer 2, shown in FIG. 2, connection establishment procedures for set up and release of connections are performed. The connection layer 2 may be thought of as comprising logical representations of the transmission facilities, i.e. the hardware equipment at the physical layer. As explained in our co-pending Swedish patent application SE 9403035-0 filed on Sep. 12, 1994 and incorporated herein by reference, a logical representation forms a logical network. Several logical networks may be built on one and the same transmission facility. An exchange at the physical layer may appear in several logical networks and may not appear in others. The same applies for lines at the physical layer. The logical representation of an exchange is referred to as a switch fabric. The logical representation of a physical line is referred to as a trunk. A logical network is created using a process called configuration. Configuration takes place when a logical network is created or is changed. Different logical networks may have different operators. Building blocks of a logical network are switch fabrics, trunks and routing tables.

In FIG. 2 only one logical network is shown. It comprises four switch fabrics F1–F4 each one corresponding to a respective one of the exchanges EX1–EX4 as indicated by the vertical dashed lines. At switch fabric F1 a part of physical line L12 is represented by a trunk 5. At switch fabric F2 the same part of the same physical line L12 is represented by a trunk 6. Switch fabric F2 has two trunks 7 and 8, trunk 7 being a part of physical line L24, trunk 8 a part of physical line L23. Switch fabrics F3 and F4 are shown to have trunks 9 and 10 respectively. At each switch fabric F1–F4 there are routing tables 11–13 used for routing of an incoming call, at the connection layer. At the connection layer all call set up processes take place.

The call layer 3, shown in FIG. 3, may be thought of as a logical representation of a service network used for signalling. A service network may or may not form part of the physical layer. The call layer 3 is shown to comprise a service network 14 to which the program source 4, the terminals S2–S4 as well as VT2, VT3 and VT4 are connected.

At the call layer 3 shown in FIG. 3 all service control processes are performed. Service control takes place on an end-to-end basis, with respect to an individual service request. Service control is thus separated from the connection set up processes. At the call layer the digits and characters dialled at an access unit, which in FIG. 1 are shown to comprise any of the telephone sets T2–T4, are analyzed in order to establish the type of service requested as well as the particular program identity. Next the originating and terminating terminal units starts a signalling session during which they i.a. agree upon the conditions of the requested service. In this particular case they agree upon setting up a point-to-multipoint connection and this information, together with information on the originating and terminating terminals are sent in the form of a connection request, symbolized by arrow 15, to the connection layer 2.

At the connection layer 2, upon receipt of said connection request, the requested point-to-multipoint connection is set up. The distribution of the program then takes place at the physical layer.

Next the point-to-multipoint mechanism in accordance with the present invention will be described in connection with multicasting of a lesson which is transmitted in video format from the program source 4 which belongs to a subscriber S1, in this case a university for example. The multicasting service starts by setting up of a particular type of connection, referred to as a point-to-multipoint connection, from a remote subscriber S3 to the program source 4. Subscriber S3 keys in the aforementioned code sequence at her/his access unit, the telephone set T3 in the illustrated case. This will start, at the call layer 3, a digit analyses to establish the terminal at which the requested point-to-multipoint connection should be terminated, in this case the program source 4 residing in exchange EX1. Next there is started a signalling session between the identified terminating terminal S1 to which the program source 4 is connected and the originating terminal to which terminals T3 and VT3 are connected. This session is represented by a procedure 16 at terminal S1 and a procedure 17 at S3. The signalling in the service network 14 is represented by arrow 18. The procedures agree to set up a point-to-multipoint connection between S1 and S3. As a result a connection request, represented by arrow 19, is sent to the connection layer 2, said connection request containing the two end points, i.e. the originating and terminating terminals respectively, of the requested point-to-multipoint connection. In particular said connection request is sent to the fabric associated with the originating terminal, said fabric in this case being fabric F3.

In response to the connection request 19 program software in switch fabric F3 will start a point-to-multipoint connection establishment process 20 having an identity 21 labelled "DIST-FROM-S1" corresponding to the identity of the requested program as keyed in at the subscriber's S3 access unit. This process is described in detail with reference to FIG. 5. The first action performed by process 20 is to check, decision box 22 if there is a list referred to as DIST-FROM-S1-list (DIST being short for distribution). In this particular case the list does not exist, alternative NO at decision box 22. Next the missing DIST-FROM-S1-list is created, box 23. This list is shown at 24 in FIG. 2 and comprises two columns 25 and 26. In the beginning the list is empty. Next, box 27, a connection is set up from S3 in a direction towards S1. To this end conventional routing analyses is performed in switch fabric F3. As input parameters to the routing analyses S1 is used, S1 being the point that should terminate the connection. S1 is resident in switch fabric F1 and accordingly the target of the connection is F1. Accordingly F1 is used as input parameter for routing analyses in F3. Routing table 13 in F3 indicates that trunk 9 should be used for the connection. Trunk 9 is associated with trunk 8 in F2 and the connection will propagate to F2. After a similar routing procedure in F2 the connection propagates to F1. Routing analyses in switch fabric F1 reveals that S1 is located within F1 and the connection is set up to program source 4. Next program software at the connection layer 2 sets up a point-to-point connection from S3 to S1 in the physical layer and associates distribution point D1 with S1. Next all potential distribution points along the completed connection are entered in the DIST-FROM-S1-list 24, box 28, FIG. 5. Since the transmission direction of the program is from S1 to S3 the ports seized by the connection, as seen in the program transmission direction, at the respective exchanges EX1, EX2 and EX3 are inlet ports. These inlet ports will also form potential distribution points and are labelled D1, D2 and D3 respectively. In particular distribution point D1 is entered in the first line of list 24, distribution point D2 in the second line and distribution point D3 in the third line. Next a running index, associated with each of the potential distribution points in list 24 is stepped up, box 29. The index associated with an individual distribution point indicates the number of branches and leaves which have been set up from the distribution point and thus accordingly the number of branches and leaves to which the program is distributed from said individual distribution point. In the present case there is just one branch from each one of the potential distribution points D1, D2 and D3 and accordingly the running index is stepped up from 0 to 1 at D1, D2 and D3. Thus there has been established a point-to-point connection between the program source 4 and the remote subscriber S3 The program is transmitted from the program source 4 to subscriber S3 over the established connection.

Said point-to-point connection may be thought of as the "trunk" of an imagined tree. From the "trunk" one can imagine that branches and leaves can extend, such imagined branches having their origin in a distribution point. A "trunk" refers to the biological term tree and should not be interchanged with the telecommunication term trunk. The "trunk" is indicated by the broad solid line 30 in FIG. 1.

Next it will be described how some of the physical resources engaged in the established connection between S1 and S3 are used when the same program is distributed to subscriber S4 which resides in exchange EX4. In other words a branch should be added to the "trunk" 30 of the imagined tree.

Procedures 16' and 17', similar to procedures 16 and 17, but this time refer to S4 and S1, will start at the call layer 3 when S4 keys in the aforementioned code sequence. As a result thereof a connection request 19' is sent to the connection layer. In response to the connection request 19' a new process 20' similar to process 20 and having the same identity 21, starts, this time in fabric F4. As input parameter to be used in the forthcoming routing analyses procedure 17' gives S1. This information is received by process 20'.

As shown in FIG. 5 the process 20' starts by asking if there exists a DIST-FROM-S1 list, decision box 22. The answer is "YES", there exists a such a list 24. Instead of routing the requested connection to S1, in accordance with conventional call set up procedures, the process 20' reads the distribution points resident in the DIST-FROM-S1-list, box 31, and selects among these one to which the connection from S4 is set up. The selection step is represented by box 32. Accordingly distribution points D1, D2 and D3 are read. Among these one is selected to which the requested connection is set up. Generally the selected distribution point is the distribution point nearest to the originating terminal. Depending on the current traffic situation this might be but need not, be, the optimum point to which the requested connection from S4 would be set up. Selection of distribution point is made either by use of an algorithm 33, or by use of a look-up-table 34. In either case a distribution point, selected among the potential ones in list 24, is returned. In the described example potential distribution point D2 is returned. The method of finding a reasonable distribution point does not form part of the present invention and is therefor not described. Next, box 2, a connection is set up from S4 to distribution point D2 in exchange EX2. Now the potential distribution point D2 becomes a real distribution point. In D2 the program transmitted from program source 4 is copied. Next, box 28, any new potential distribution points along the connection just setup are entered in the list 24. In this particular case switch fabric F4 has a potential distribution point D4 which is entered into list 24. There are no additional switch fabrics between F4 and F2. Should such additional switch fabrics be present between F4 and F2 their potential distribution points would have been added to list 24. Finally the running indexes in column 25 are updated to reflect the current number of branches and leaves at each distribution point. In particular the running index at D2 in list 24 is stepped up from 1 to 2 and the running index at D4 is set to 1. The running indexes for D1, D2, D3 and D4 are now 1, 2, 1 and 1 respectively.

The copied program in D2 is distributed to S4 over the connection just set up. Said connection is resident in physical line L24. Subscriber S4 will now be looking at the same program as S3. When S4 was connected to D2 a new branch was added to the existing "trunk" 30.

Using the same connection scheme as described above a leaf can be connected to a branch. This would happen if subscriber S2, resident in exchange EX2 keys in the aforementioned code sequence. In such a case there is created an exchange-internal connection 35 to the distribution point D2 and the running index at D2 would be stepped up from 2 to 3.

When S2 was connected to D2 a leaf was added to the "trunk" 30. Of course a leaf can be added to a branch. This would happen if an additional subscriber resident in EX4 keys in the aforementioned code sequence. An additional exchange-internal connection, similar to the exchange-internal connection 35, would then be set up in EX4.

The running indexes in list 24 play an important role during release of established to point-to-multipoint connections. This will be described next.

In accordance with the present invention release of a point-to-multipoint connection propagates in the same direction a connection was set up starting at the leafs, if such exist, working inward towards the "trunk" and finally disconnecting "trunk" sections.

With all of S2, S3 and S4 viewing the program the running indexes at D1, D2, D3 and D4 are 1, 3, 1 and 1 respectively. It is now supposed that S4 no longer wants to view the program. S4 thus wants to release the connection S4→S1. Depending on the actual implementation of the communication system subscriber S4 either keys a specific disconnection code sequence or just shuts off her/his terminal unit VT4. In response to this a disconnect order is sent from the call layer 1 to the connection layer 2.

The disconnect order is not shown in FIG. 3 but is generally of the same character as the connection request function 17. The disconnect order in its turn starts a multipoint-to-point release process in switch fabric F4 and is generally of the same character as the point-to-multipoint connection set-up process 20.

Figure 6:
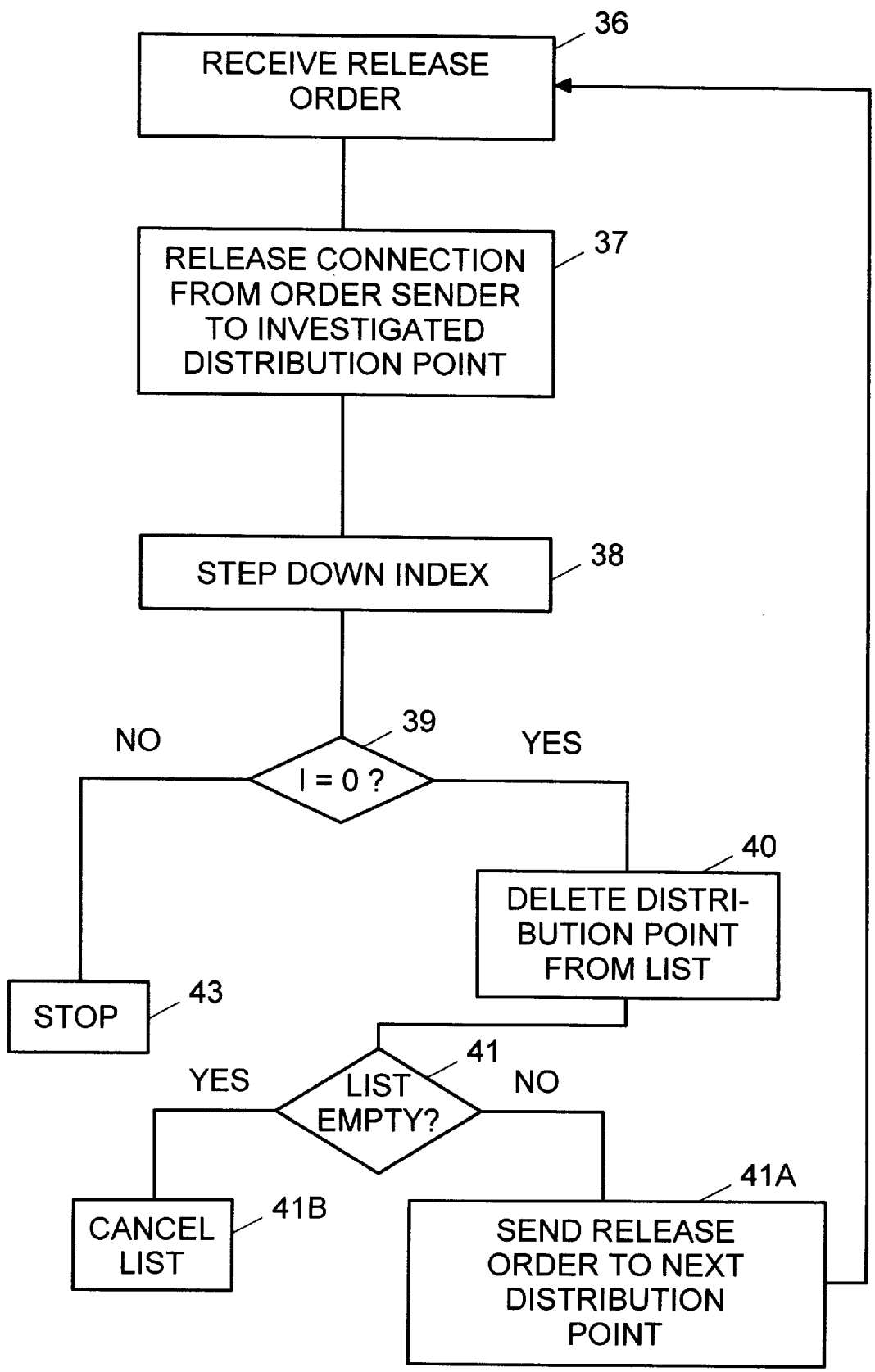
FIG. 6 is a flow diagram illustrating a method of disconnecting a point-to-multipoint connection in accordance with the invention.

The steps performed by the multipoint-to-point release process are shown in FIG. 6. The process starts in the fabric receiving the disconnect order, box 36, in this case in F4. The release process starts by disconnecting, box 37, the connection from the point at which the disconnect order was issued. In this case the exchange-internal connection T4→D4, shown by a dashed line, is released. Next, box 38, the index of D4 is stepped down from initial 1 to 0. Next, box 39, the index at D4 is tested, decision box 39, to see if it is 0 or not. In this case the index at D4 equals 0 and alternative YES is selected. The investigated distribution point D4 is next deleted from the DIST-FROM-S1 list 24, box 40. Next it is tested, decision box 41, if the DIST-FROM-S1 list 24 is empty. Since it isn't, alternative NO is selected. It is now safe to release the connection to the next distribution point, D2, as seen in a direction towards the program source 4 since there are no further exchange-internal subscribers viewing the same program, nor are there any additional branches connected to the investigated distribution point D2. Therefor a release order is sent, box 41A, to the next distribution point, as seen in a direction towards the program source 4. This order, represented by arrow 42, is received at switch fabric F2, box 36, which starts a release procedure similar to the one just described. The connection from D4 to D2 along line L24 is released, box 37, and the index at D2 is stepped down from 3 to 2, box 38. The test at the decision box 39 gives as result that the index at D2 is not equal to 0 and therefor alternative NO is selected. Now the release process stops, box 43, since the program is obviously still viewed by two items (leaves or branches), in this case a leaf, represented by S2, and the "trunk" section from EX2 to EX3. No further parts of the connection towards S1 is disconnected. The original "trunk" 30 remains set up. The DIST-FROM-S1-list 24 now contains D1, D2 and D3 having the respective running indexes of 1, 2 and 1. Should subscriber S3 now like to switch off the program the processes of FIG. 6 would be repeated starting with switch fabric F3. At first the exchange-internal connection VT3→D3, indicated with a dashed line, would be released and D3 would be removed from the DIST-FROM-S1-list 24, box 40. The list now contains D1 and D2 and is therefor not empty. A new release order is sent and the "trunk" section from EX3 to EX2 would be released, box 37. The index at D2 is stepped down from 2 to 1. The list would now contain only D2 and D1 having the respective indexes of 1 and 1.

Further release of trunk sections from D2 to D1 would not be allowed since the D2 index is greater than 0.

Subscriber S2 would still view the program. The connections now existing would be the dashed inter-exchange connection to S2, the "trunk" section D2→D1 and the dashed inter-exchange connection to the program source 4.

When finally S2 stops viewing the program all remaining connections are released, emptying all entries in list 24, setting all indexes therein to 0, and finally the test at decision box 41 verifies that the DIST-FROM-S1 list is empty. Alternative YES is selected and the DIST-FROM-S1 list 24 is canceled, box 41B. This completes the release of the point-to-multipoint connection.

Figure 7:
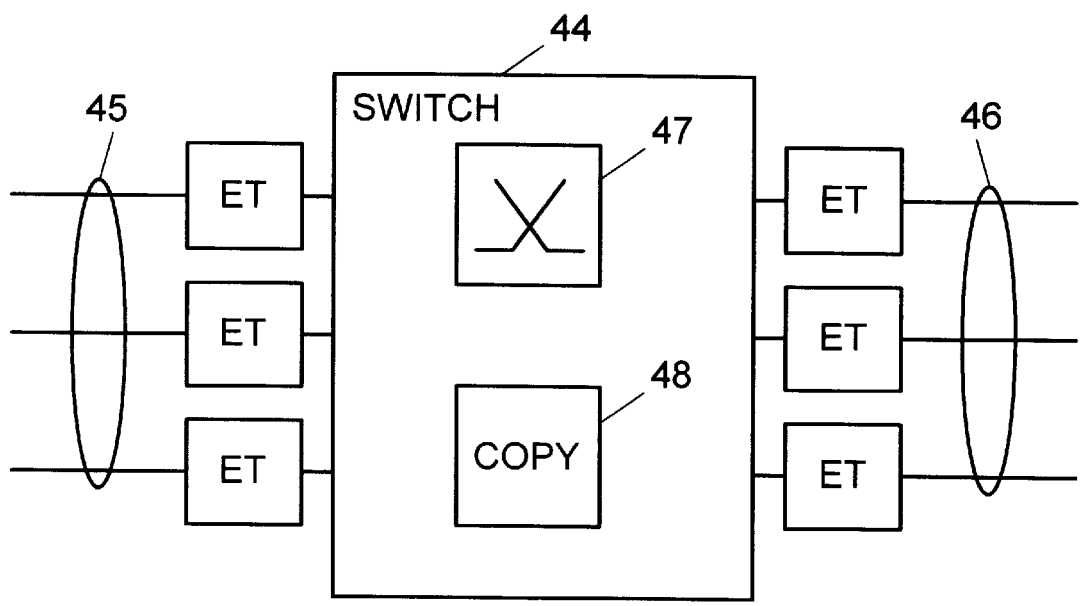
FIG. 7 is a block diagram of an exchange provided with an information copying function.

If the bearer service is STM the time slot stream transmitted to EX2 will be duplicated. If the bearer service is ATM a cell duplicating device is used in EX2. In FIG. 7 there is shown a switch 44 having a number of physical links connected thereto. The links are collectively labeled 45 and 46 respectively. At each end of a link there is a respective exchange terminal ET connected to the switch. The switch is shown to have a switch function 47 comprising hardware and software for switching and copying function 48 comprising hardware and software for duplicating the information which shall be distributed to various branches and leafs in a point-to-multipoint connection. Such a copying function is well known and will therefore not be described in detail. The hardware of the copying function may either be integrated within the switch 44 or may be in the form of external units Next it will be described how an inter-domain point-to-multipoint connection is set up. A domain is an area comprising a number of switches using a common data base. In each data base subscriber data relating to the subscribers within the domain served by the data base are stored. The data base may either be a central one or a distributed one In FIG. 8 the physical layer 1 and the connection layer 2 are shown to comprise three domains 50, 51, 52 separated by domain borders represented by vertical dashed lines 53 and 54 respectively. Each domain is served by a respective data base 55, 56 and 57. The physical network layer 1 comprises a number of exchanges EX1–EX10 shown as unfilled squares. Subscriber S1 belongs to exchange EX1 resident in domain 50 while subscriber S3 belongs to exchange EX7 resident in domain 52. The set up of a point-to-multipoint connection is initiated at the call layer, not shown in FIG. 8, by an end-to-end signalling between S1 and S3 in the same manner as described in connection with FIG. 3. It should be understood that the three domains 50–52 are all contained in the service network 14 shown in FIG. 3. When the requested point-to-multipoint call is routed from S3 towards S1 program software in switch EX7 notes, decision box 22 in FIG. 5, there is no DIST-FROM-S1 list. Next a list is created, box 23, this list being labelled 58. Next the connection is routed from EX7 to EX5, EX5 being the last exchange in domain 52 in the routing direction towards S1. Potential distribution points, in this case D7, D6 and D5, are entered into the list 58. At domain border 54, in particular at EX5, there is a route that leaves domain 52 and enters domain 51 and the connection is propagated to EX4 in domain 51. At the connection layer 2 in domain 51 there is created a new process 20, similar to that shown in FIG. 2, in EX4, for setting up a point-to-multipoint connection having S1 as its destination. Once program software in EX4 recognizes the connection as a point-to-multipoint connection, it starts looking for a DIST-FRON-S1 list, decision box 22 in FIG. 5. No such list exists and will next be generated, box 23. This list is labelled 59. The same procedures as described in connection with domain 52 will now take place in domain 51. Distribution points D3 and D4 are entered into the list 59 together with respective indexes. At the next domain border 53 the same procedures are repeated. The connection is propagated from EX3 to EX2. At EX2 the procedures described in FIG. 5 take place. A DIST-FROM-S1 list 60 is created, potential distribution points D2 and D1 are entered therein together with its respective indexes. At the physical layer 1 there has now been set up a "trunk" 61 between program source 4 at subscriber S1 and subscriber S3, said "trunk" being shown with a broad solid line 61. The DIST-FROM-S1 lists 58, 59 and 60 look like those shown in FIG. 8.

Suppose subscriber S4, belonging to exchange EX8 resident in domain 52, would like to view the same program. As described before she/he keys in the aforementioned code sequence at her/his access unit. Program software in exchange EX8 routes the requested point-to-multipoint connection, not to the program source S1 as would be the case if there was a normal call, but to distribution point D6 in EX6. This is so because said program software in EX8 finds that there exists a DIST-FROM-S1 list, list 58, decision box 22 in FIG. 5. The distribution points therein are read, box 31, and the algorithm selects, box 34, distribution point D6. The selection is for example based on the criterions that EX6 is nearest to EX8 and that the traffic intensity on the route between EX6 and EX8 allows for the connection of S4 to EX6. A connection from S4 to D6 is set up, box 27, said connection being shown with dashed line 62 in FIG. 8. A potential distribution point D8 is created and is entered into DIST-FROM-S1 list 58, box 28. Finally the index associated with distribution point D6 is stepped up from 1 to 2. Connection 61 represents a new branch that has been added to the "trunk" 61.

Next, suppose subscriber S5, belonging to exchange EX10, wants to look at the same program. The same procedures as described above would take place, but in this case the algorithm 33 used in step 32 might for example find that neither D3 nor D4 should be selected, since they are sitting in routes that are overloaded with traffic. Instead the algorithm suggests conventional routing towards D1. Accordingly the connection is routed towards D1 and when it enters EX2 in domain 50 exchange EX2 will detect that the incoming connection is a point-to-multipoint connection which should have a corresponding treatment. Accordingly EX2 will start the process described in FIG. 5. Since there is a distribution list 60 in this domain 50, distribution point D2 will be selected and the connection from S5 will be terminated in the selected distribution point D2. This connection is indicated by the dashed and dotted line 63. A new potential distribution point D10 is added to the DIST-FROM-S1 list 59, and the index associated with D2 in list 60 is stepped up from 1 to 2.

Figure 8:
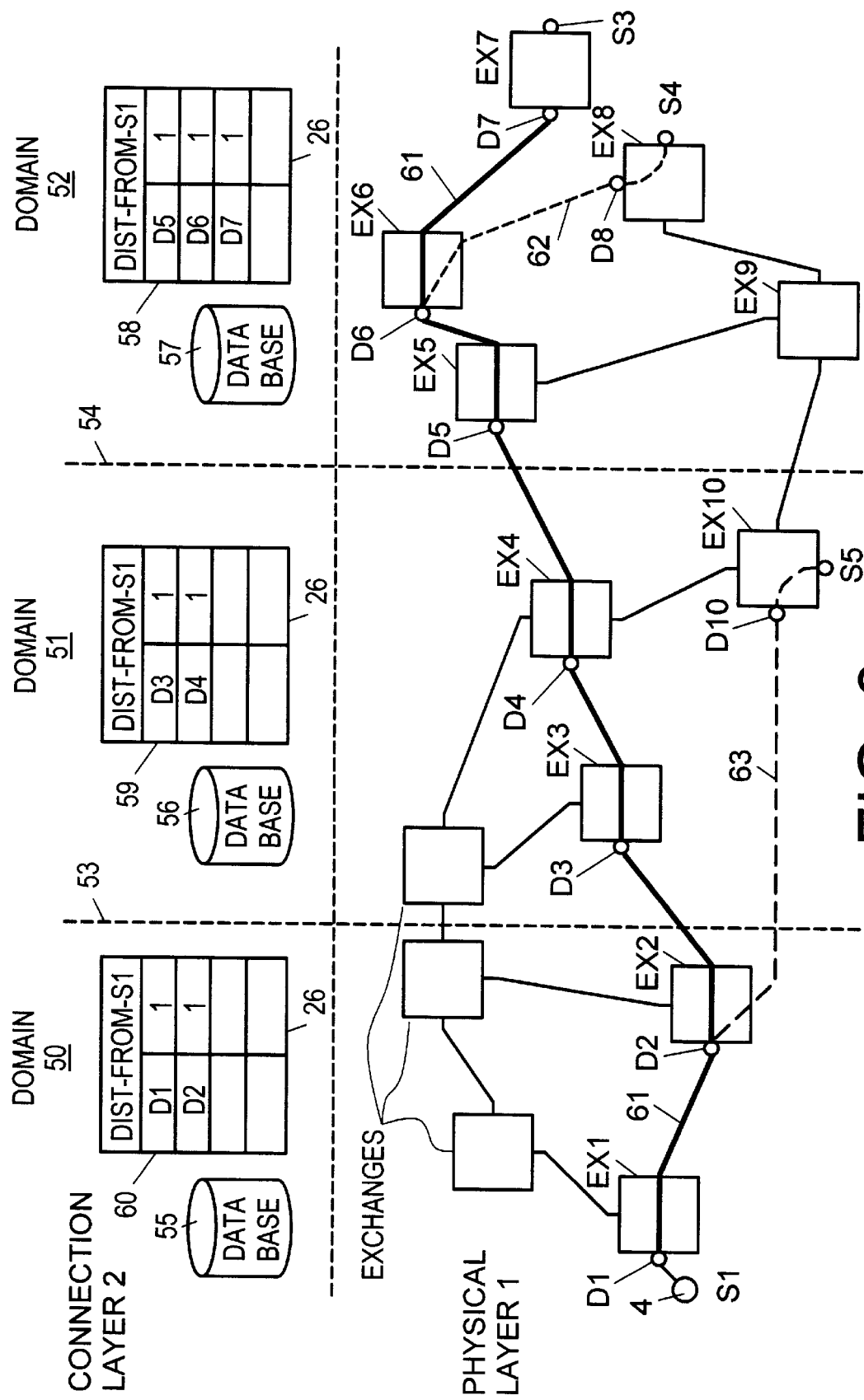
FIG. 8 is a block diagram similar to FIGS. 1 and 2 showing a second embodiment of the present invention.

From the above description it is evident that a subscriber which dials the code sequence associated with a particular program will have the program delivered to his/her terminal unit right away. The time the program is delivered is most certainly not coincident with the beginning of the program. Accordingly she/he starts viewing right in the middle of the program. This is often unacceptable. A way to circumvent this would be to start the sending of the same program every fifteen minutes and to delay delivery of the program to a subscriber until the beginning of the next program starts being transmitted. Each program would then be associated with a respective point-to-multipoint connection. At the connection layer there would exist, in one and the same logical network, several point-to-point connections, each one associated with a respective point-to-multipoint connection identity 21. In FIG. 8 the identity 21 of a particular point-to-multipoint connection is carried from domain to domain and is the same in all of the domains. Point-to-multipoint connections and a DIST-FROM-list relating to another program source than program source 4 would have its own identity.

As described above access to the point-to-multipoint service is gained from a telephone set by dialling a particular code sequence, said code sequence being transported by the telecommunication network shown in FIG. 1. Of course other access devices using other networks than the telecommunication network shown in FIG. 1 may be used.

In the point-to-multipoint service described above the program is distributed in a first direction, while the point-to-point connections propagate, during set up thereof, in a second direction, which is opposite to the first direction. Moreover, the point-to-point connections are released in the same direction as that in which they propagate during set up, i.e. in the first direction.

The inventive idea is also applicable for a distributive service called multipoint-to-point connections. Examples of multipoint-to-point connections are data acquisition and voting. For example meteorological data from many geographically distributed observation stations are reported to a central station. An example of using multipoint-to-point connections for voting is when lots of people call one and the same directory number simultaneously to place their votes. For example a radio station may encourage their listeners to vote for the 10 most popular melodies among a selection of melodies.

Multipoint-to-point connections may use call set up procedures which are different from those described above. Since they do not form part of the present invention they will therefore not be described. It is sufficient to know that in result of a call from a first calling user to a called user, a connection therebetween is set up. To this connection a second caller may connect in order to send her/his information to the same called user. The procedure can be repeated for more and more callers and eventually a tree of connections similar to that shown in FIG. 9 has been established. In multipoint-to-point connections connections merge together in a merge point. There is no copying of information in a merge point like in a distribution point in point-to-multipoint connections.

Figure 9:
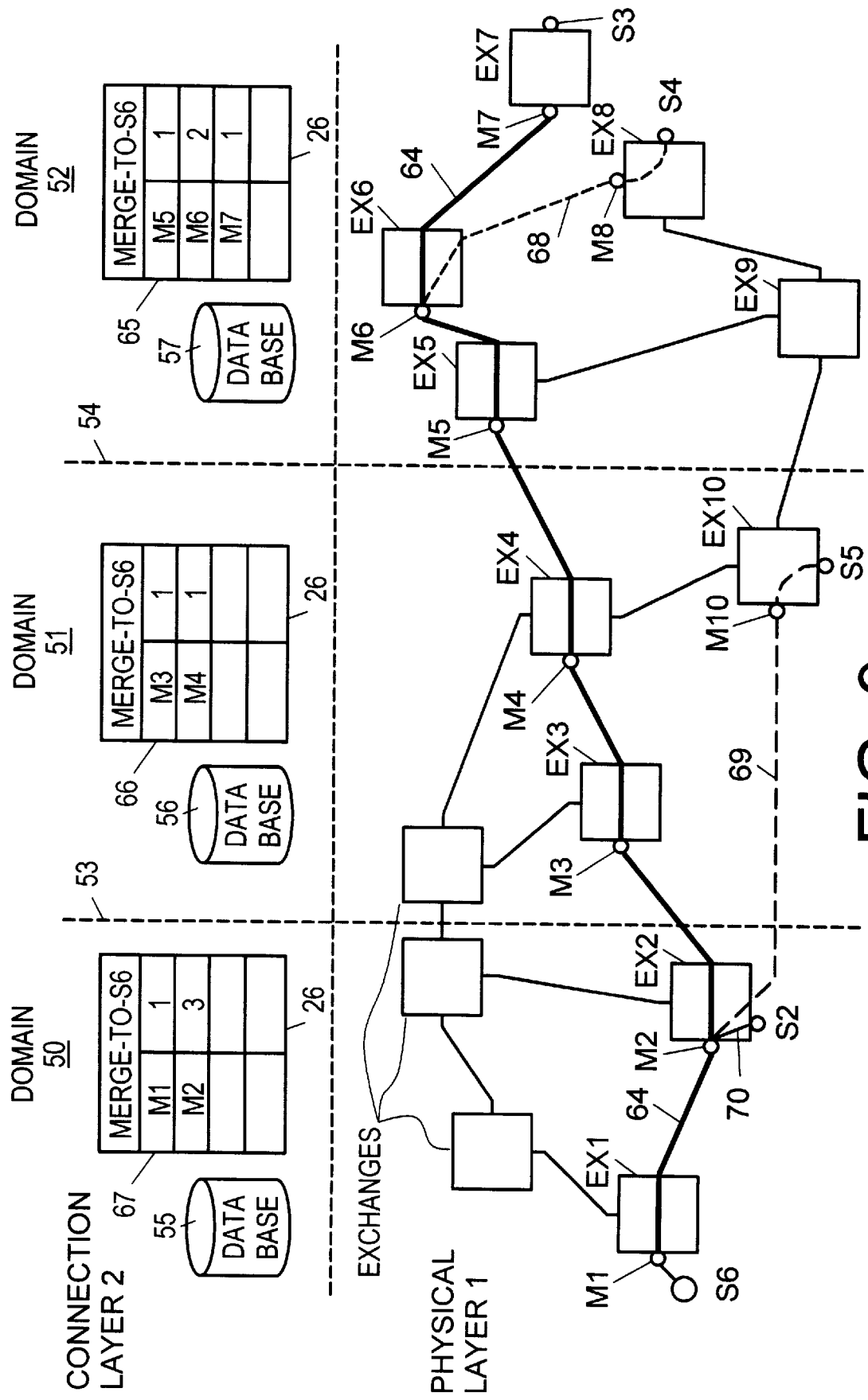
FIG. 9 is a block diagram showing multipoint-to-point connections in a telecommunication network similar to that shown in FIG. 8.

In FIG. 9 subscriber S3 is supposed to be the first calling user that makes a call to a radio station S6 to place her/his vote. A connection 64 is established using a set-up procedure similar to that shown in FIG. 5. In much the same manner as described in connection with FIG. 5 merge-to-S6 lists 65, 66, 67 are created in each of the domains 50, 51, 52.

The purpose of the merge-to-S6 lists is the same as described in connection with FIG. 8, i.e. to use transmission facilities in common for several subscribers along a common route and to ensure controlled release of connections. Accordingly, starting with the first connection set up between the first caller S3 and the called station S6 merge-to-S6 list 65 is created and merge points M1 and M2 are entered, next merge-to-S6 list 66 is created and merge points M3 and M4 are entered therein and finally merge-to-S6 list 67 is created and merge points M5, M6 and M7 are entered therein. Connection 64 becomes a "trunk" of an imagined tree. As more callers crop up branches and leaves are added to the "trunk", new merge points are entered into the merge-to-S6 lists 65–67 and the running indexes of the listed merge points are changed. In FIG. 9 subscriber S4 has called the directory number of station 6 and in response to this a connection 68 is set up to merge point M6. Subscriber S5 has also made a call to S6. In the illustrated example it is supposed that there is no bandwidth available on the trunks between EX4 and EX2. Therefore the call is neither routed to M4 nor M3. Instead it is treated as a normal call and is routed towards S6. When it enters EX2 digit analyses therein identifies the call as a multipoint-to-point call and the connection is routed to M1 following a connection procedure similar to that of FIG. 5. The connection from S5 is labelled 69. Connections 68 and 69 represent branches of the imagined tree. Subscriber S2, resident in EX2, has also made a call to S6 and this results in the set up of an inter-exchange connection 70 from S2 to merge point D2. Connection 70 represents a leaf.

The bandwidths of the "trunk" sections are also changed. In particular the bandwidth of "trunk" sections that exists at the top of the imagined tree is small, since the amount of traffic is low there. As the traffic load increases along a part of a "trunk" section the bandwidth of that section is increased to correspond to the current traffic load. This is illustrated by the varying width of the line representing connection 64. Running band width assignments may take place at "trunk" end sections of branches of the tree. Assignment of bandwidth is controlled by a non-shown operating and support system.

When users disconnect, their connections will be released in much the same manner as described in connection as described in connection with FIG. 5. The merge-to-S6 lists are used to ensure connections are released in proper order. Not until the running index associated with a particular merge point becomes 1 the connection from said particular merge point to the next—as seen in a direction towards merge-point M1 to which S6 is connected—will be released when the user connected to said particular merge point disconnects. The multipoint-to-point service often uses bearer services based on packet switching technique.

In the multipoint-to-point service described above the information from the users propagates in a first direction. The point-to-point connections 64, 68, 69 propagate, during set up thereof, in the same first direction. The point-to-point connections are released in the same direction as that in which they propagate during set up, i.e. in the first direction.

What is claimed is:

1. In a telecommunication network having program controlled exchanges, trunks extending between the exchanges and subscriber terminals connected to respective ones of the exchanges, a connection establishment process for setting up a connection in response to a point-to-multipoint service request, comprising the following steps:
    (a) establishing a first point-to-point connection between a first terminal and a source terminal from where a program is distributed to the first terminal,
    (b) assembling potential distribution points associated with exchanges along said first point-to-point connection, the end exchanges inclusive, in a list, and
    (c) using said list for setting up further point-to-point connections from further subscribers, to which the same program shall be distributed, to selected ones of said distribution points.

2. A process in accordance with claim 1, said process further comprising a connection release process that uses said list for releasing individual connections of said point-to-multipoint connection in response to release orders in proper order so as not to disrupt the distribution of said program to a subscriber terminal at which no release order has been issued.

3. A process in accordance with claim 2, wherein a running index is associate with every distribution point in said list, each running index being indicative of the number of first, second and third connections emerging from its associated distribution point.

4. A process in accordance with claim 3, wherein upon receipt of a request from a subscriber terminal to release its connection to said source terminal, said connection is released in a direction from the subscriber terminal towards the distribution point selected for said connection, and that the running index associated with said selected distribution point is stepped down.

5. A process in accordance with claim 4, wherein the stepped down running index is examined to determine if it is zero or not, and if it is zero its associated distribution point is deleted from said list, and if it is not zero further execution of the connection release process is stopped.

6. A process in accordance with claim 5, wherein if said index equals zero, the process next tests if the list is empty, and if the list is not empty an order to release the connection from said selected distribution point is sent to the next as seen in a direction towards said source terminal, and if the list is empty the list is canceled.

7. A process in accordance with claim 6, wherein a connection is released in a direction which is the same as that in which it was set up.

8. In a telecommunication network having program controlled exchanges, trunks extending between the exchanges and subscriber terminals connected to respective ones of the exchanges, a connection establishment process for setting up a connection in response to a point-to-multipoint service request, comprising the following steps:
    (a) establishing a first point-to-point connection between a first terminal and a source terminal from where a program is distributed to the first terminal,
    (b) assembling potential distribution points associated with exchanges along said first point-to-point connection, the end exchanges inclusive, in a list,
    (c) using said list for setting up further point-to-point connections from further subscribers to which the same program shall be distributed, to selected ones of said distribution points, such that
    (d) upon receipt of a second point-to-multipoint service request from a second subscriber terminal to which said program shall be distributed, said second subscriber terminal being connected to an exchange which is not associated with any of the distribution points currently in said list, selecting a distribution point from said list and setting up a second point-to-point connection from said second subscriber terminal to an exchange associated with the selected distribution point, and
    (e) adding to said list: (i) the potential distribution point resident in and associated with the second exchange and (ii) any potential distribution points associated with exchanges along said second point-to-point connection.

9. A process in accordance with claim 8, wherein method steps (d) and (e) are repeated for each further point-to-multipoint connection request.

10. A process in accordance with claim 9, wherein upon receipt of a point-to-multipoint service request from a third subscriber terminal that is connected to an exchange which is associated with a distribution point currently on said list a third point-to-point connection is set up from the third subscriber terminal to the distribution point associated with said exchange.

11. A process in accordance with claim 10, wherein a routing algorithm is used for selecting said distribution point.

12. A process in accordance with claim 11, wherein said first, second and third point-to-point connections propagate in a first direction from said first, second and third subscriber terminals towards the respective selected distribution points, said first direction being opposite to the direction in which said program is distributed.

13. A process in accordance with claim 12, wherein an individual connection establishment process and its associated list of potential distribution points is provided with an identity said individual connection establishment process relating to one and the same program.

14. A process in accordance with claim 13, wherein said connection establishment process as an input parameter takes the identity of said source terminal, that in response to said input parameter said connection establishment process:
    (e) starts examining if there is a list which has an identity corresponding to that of the source terminal, and, provided such list does not exist, performs steps (a) and (b) and provides said list with said identity, otherwise, in which case such list exists, (f) performs step (c).

15. A process in accordance with claim 14, wherein said telecommunication network is divided into domains, each domain being served by an individual data base containing subscriber data, and said connection establishment process, in case said source terminal does not reside in the same domain as that in which said connection establishment process is invoked by a subscriber terminal, propagates said second point-to-point connection to a trunk of an exchange in a domain next to the domain in which said process is invoked, as seen in a direction from the domain in which the process was invoked towards the domain in which said source terminal is resident, in which exchange step (e) is performed.

16. In a telecommunication network having program controlled exchanges, trunks extending between the exchanges and subscriber terminals connected to respective ones of the exchanges, a connection establishment process for setting up a connection in response to a multipoint-to-point service request, comprising the following steps:

(a) establishing a first point-to-point connection between a first terminal and a target terminal to which information produced at the first terminal is distributed, (b) assembling potential merge points, resident in and associated with exchanges, along said first point-to-point connection, the end exchanges inclusive, in a list, and (c) using said list for setting up further point-to-point connections from further subscribers to selected ones of said merge points.

17. A process in accordance with claim 16, further comprising a connection release process that uses said list for releasing individual connections of said multipoint-to-point connection in response to release orders in proper order so as not to disrupt the transmission of said information from a subscriber terminal to said target terminal.

18. A process in accordance with claim 17, wherein a running index is associated with every merge point in said list, each running index being indicative of the number of first, second and third connections merging into its associated merge point.

19. A process in accordance with claim 18, wherein the connection release process upon receipt of a request from a subscriber terminal to release its connection to said target terminal, said connection is released in a direction from the subscriber terminal towards the merge point selected for said connection, and the running index associated with said selected merge point is stepped down.

20. A process in accordance with claim 19, wherein the connection release process next examines the stepped down index to examine if it is zero or not, and if it is zero deletes its associated merge point from said list, and if it is not zero stops further execution of the connection release process.

21. A process in accordance with claim 20, wherein the connection release process, if said index equals zero, next tests if the list is empty, and if the list is not empty sends an order to release the connection from said selected merge point to the next as seen in a direction towards said target terminal, and if the list is empty cancels the list.

22. A process in accordance with claim 21, wherein a connection is released in a direction which is the same as that in which it was set up.

23. In a telecommunication network having program controlled exchanges, trunks extending between the exchanges and subscriber terminals connected to respective ones of the exchanges, a connection establishment process for setting up a connection in response to a multipoint-to-point service request comprising the following steps:

(a) establishing a first point-to-point connection between a first terminal and a target terminal to which information produced at the first terminal is distributed, (b) assembling potential merge points, resident in and associated with exchanges, along said first point-to-point connection, the end exchanges inclusive, in a list, (c) using said list for setting up further point-to-point connections from further subscribers to selected ones of said merge points, such that (d) upon receipt of a second multipoint-to-point service request from a second subscriber terminal, said second subscriber terminal being connected to an exchange which is not associated with any of the merge points currently in said list, selecting a merge point from said list and setting up a second point-to-point connection from said second subscriber terminal to the exchange associated with the selected merge point and (e) adding to said list: (i) the potential merge point resident in and associated with the second exchange and (ii) any potential merge points associated with exchanges along said second point-to-point connection.

24. A process in accordance with claim 23, wherein steps (d) and (e) are repeated for each further multipoint-to-point connection request.

25. A process in accordance with claim 24, wherein upon receipt of a multipoint-to-point service request from a third subscriber terminal that is connected to an exchange which is associated with a merge point currently on said list a third point-to-point connection is set up from the third subscriber terminal to the merge point associated with said exchange.

26. A process in accordance with claim 25, wherein a routing algorithm is used for selecting said merge point.

27. A process in accordance with claim 26, wherein said first, second and third point-to-point connections propagate in a first direction from said first, second and third subscriber terminals towards the respective selected merge points, said first direction being the same as the direction in which said information is transmitted to the target terminal.

28. A process in accordance with claim 27, wherein an individual connection establishment process and its associated list of potential merge points is provided with an identity relating to one and the same target terminal.

29. A process in accordance with claim 28, wherein said connection establishment process as an input parameter takes the identity of said target terminal, in response to said input parameter said connection establishment process:

(e) starts examining if there is a list which has an identity corresponding to that of the target terminal, and, provided such list does not exist, performs steps (a) and (b) and provides said list with said identity, otherwise, in which case such list exists, (f) performs step (c).

30. A process in accordance with claim 29, wherein said telecommunication network is divided into domains, each domain being served by an individual data base containing subscriber data, and said connection establishment process, in case said target terminal does not reside in the same domain as that in which said connection establishment process is invoked by a subscriber terminal, propagates said second point-to-point connection to a trunk of an exchange in a domain next to the domain in which said process is invoked, as seen in a direction from the domain in which the process was invoked towards the domain in which said target terminal is resident, in which exchange step (e) is performed.

* * * * *